(12) United States Patent
Lee et al.

(10) Patent No.: US 7,314,645 B2
(45) Date of Patent: Jan. 1, 2008

(54) PROCESS FOR PREPARING NUTRITIOUS COOKED RICE IN ASEPTIC PACKAGE

(75) Inventors: Changyong Lee, Jeju-si (KR); Hyunjun Park, Pusan (KR); Sangyou Kim, Pusan (KR)

(73) Assignee: CJ Corporation, Seoul (KR)

(*) Notice: Subject to any disclaimer, the term of this patent is extended or adjusted under 35 U.S.C. 154(b) by 385 days.

(21) Appl. No.: 10/691,604

(22) Filed: Oct. 24, 2003

(65) Prior Publication Data

US 2004/0219267 A1 Nov. 4, 2004

(30) Foreign Application Priority Data

Apr. 29, 2003 (KR) ............... 10-2003-0027239

(51) Int. Cl.
*A23L 1/182* (2006.01)
*A23L 1/36* (2006.01)
*B65D 85/00* (2006.01)

(52) U.S. Cl. ............. 426/106; 426/632; 426/618; 426/521; 426/392

(58) Field of Classification Search ........... 426/106, 426/392, 615, 626, 506, 509, 510, 438, 632, 426/521, 508
See application file for complete search history.

(56) References Cited

U.S. PATENT DOCUMENTS 4,741,911 A * 5/1988 McIntyre et al. ........... 426/325
5,756,543 A * 5/1998 Katsuragi et al. .......... 514/547
6,042,863 A * 3/2000 George et al. ............. 426/484

FOREIGN PATENT DOCUMENTS

CN 1038745 A * 1/1990
CN 1066787 A * 12/1992
CN 1096171 A * 12/1994
KR 2001018178 A * 3/2001
KR 2001079456 A * 7/2001

OTHER PUBLICATIONS

Kalbit'ang-Rib Soup: Try Korean Dishes, Sep. 17, 2000. http://www.skynews.co.kr/skynews_main/english/dishes/dishes_013.htm.*
Asia Food Features Samgyetang. http://www.asiafood.org/samg.cfm, Oct. 1, 2002 p. 1. Date obtained from http://webarchive.org.*
Trend: Samgyetang, Koreans' Favorite Summer Dish. KBS Global. pp. 1-4, date n/a.*

* cited by examiner

*Primary Examiner*—Lien Tran
*Assistant Examiner*—Kelly Mahafkey
(74) *Attorney, Agent, or Firm*—The Nath Law Group; Gary M. Nath; Susanne M. Hopkins

(57) ABSTRACT

A process for preparing nutritious cooked rice in an aseptic package, by mixing ginseng, jujube, chestnut and black rice, which has excellent taste and smell and capability of long-term preservation at room temperature. The process includes treating ginseng, jujube and chestnut with a mixed solution of an aqueous solution of calcium and an aqueous solution of 0.1-0.3% organic acid or phosphoric acid, mixing with non-glutinous rice, glutinous rice and black rice at a fixed rate, filling a fixed amount of the mixture automatically in a heat-resisting plastic container, sterilizing the mixture 4-10 times repeatedly for 4-8 seconds at a high temperature of 130-150° C. and high pressure, cooking the sterilized mixture in a measured amount of liquid for cooking, sealing and packaging the resultant cooked rice mixture aseptically so that nutritious cooked rice which is free from microorganism and capable of long term preservation (more than 6 months) can be obtained.

3 Claims, 1 Drawing Sheet

PROCESS FOR PREPARING NUTRITIOUS COOKED RICE IN ASEPTIC PACKAGE

BACKGROUND OF THE INVENTION

1. Field of the Invention

The invention relates to a process for preparing nutritious cooked rice in an aseptic package by mixing ginseng, jujube, chestnut and black rice, which has excellent taste and smell and capability of long-term preservation at room temperature. More particularly, the invention relates to a process for preparing nutritious cooked rice in aseptic package prepared by a process comprising treating ginseng, jujube and chestnut with a mixed solution of an aqueous solution of calcium and aqueous solution of 0.1~0.3% organic acid or phosphoric acid, mixing with nonglutinous rice, glutinous rice and black rice at a fixed rate, filling a fixed amount of the mixture automatically in a heat-resisting plastic container, sterilizing the mixture 4~10 times repeatedly for 4~8 seconds at high temperature of 130~150° C. and high pressure hermetically, cooking the sterilized mixture in a measured amount of liquid for cooking, sealing and packaging the resultant cooked rice mixture aseptically, so that nutritious cooked rice which is free from microorganism and capable of long-term preservation (more than 6 months) can be obtained.

2. Description of the Prior Art

Generally, there exists $10^5 \sim 10^6$ CFU/g of microorganism and $10^1 \sim 10^2$ CFU/g of heat-resistant microorganism which forms spores in ginseng. And there exists $10^3 \sim 10^4$ CFU/g of microorganism and $10^1 \sim 10^2$ CFU/g of heat-resistant microorganism which forms spores in jujube. Processed chestnut product, which is treated with sugar solution and sterilized after cutting, doesn't have any bacteria and heat resistant microorganism there, but raw chestnut has $10^3 \sim 10^4$ CFU/g of microorganism, so there is need to control microbial contamination.

And it is known that there exists $10^2 \sim 10^4$ CFU/g of microorganism on the surface of purified rice. Generally, cooked rice is produced by heating rice for more than 30 minutes at about 100° C. after adding a fixed amount of water to rice. Through the cooking, general cells of microorganism are destructed but heat-resistant spores aren't destructed completely. When the cooked rice is produced by the general method at home or the cooked rice is consumed within a day, such a heat-resistant microorganism doesn't matter, however, the multiplication of such a heat-resistant microorganism matters a lot when the cooked rice is preserved and marketed for a long time at room temperature.

As for preparing nutritious cooked rice in aseptic package, it is most important for the security of long-term preservation to control microorganism of raw material, unlike preparing retort cooked rice which is produced by the method disclosed by Korea patent application No. 1991-0023931 which includes retort sterilization.

SUMMARY OF THE INVENTION

It is the object of the present invention to provide a process for preparing nutritious cooked rice mixed with ginseng, jujube and chestnut in aseptic package by controlling microorganism contamination, which has excellent taste and smell and capability of long-term preservation at room temperature.

Inventors repeated research and experiment to solve the problem. In result, the level of microorganism decreased by blenching and soaking ginseng, jujube and chestnut in mixed solution of aqueous solution of calcium and aqueous solution of organic acid or phosphoric acid whereby the quality of the resultant product improved. After the pretreatment, sterilization at high temperature/pressure and cooking in a fixed amount of water mixed with glucono delta lactone (GDL) was carried out to provide a process which satisfies the safety of the product. And the final pH of the product was adjusted to about 5.0.

Thus, inventors perfected the process for preparing cooked rice having texture, taste and flavor equal to that of cooked rice prepared by general method at home.

DETAILED DESCRIPTION OF THE INVENTION

Figure 1:
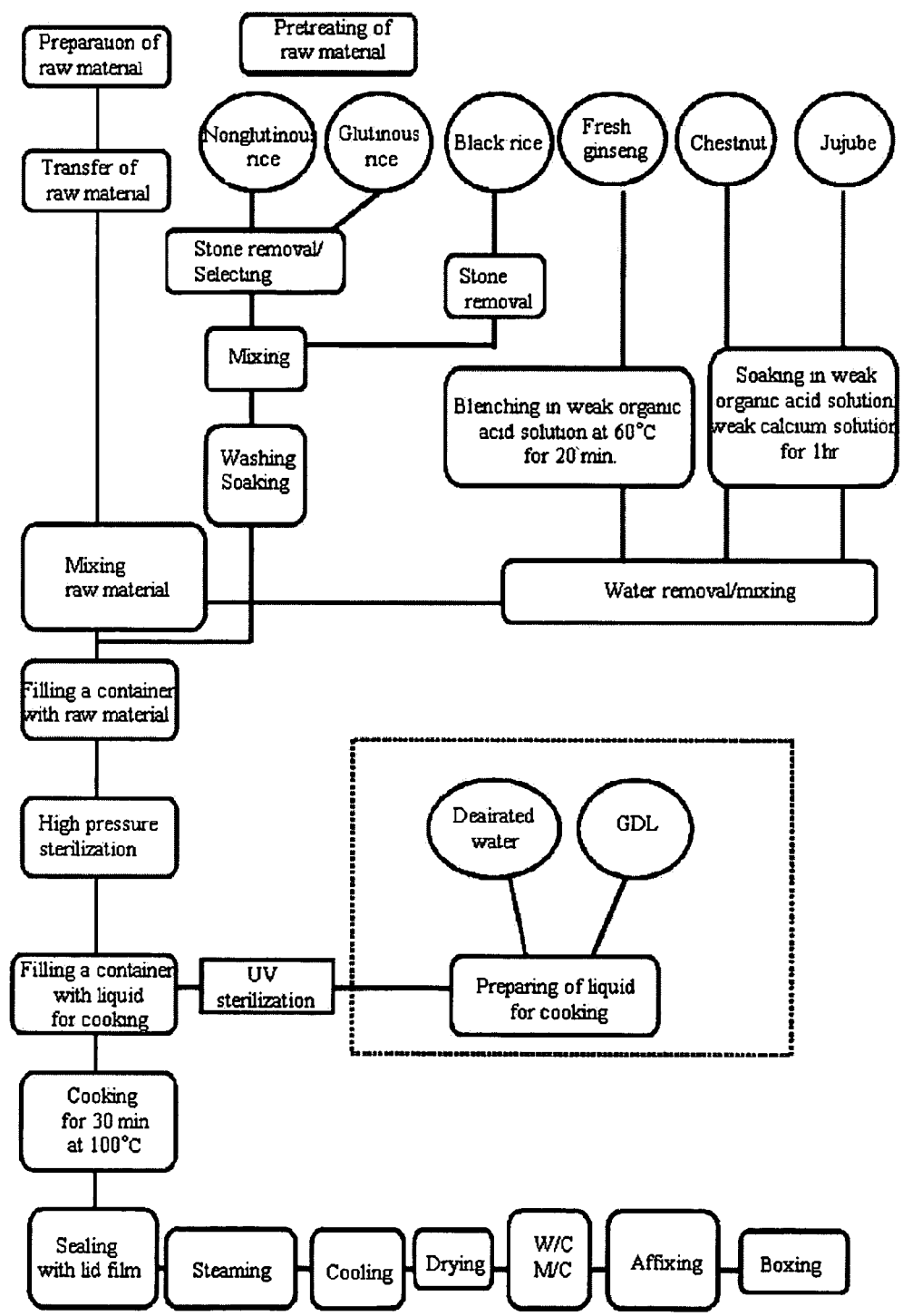
FIG. 1 illustrates flow chart of a process for preparing nutritious cooked rice in aseptic package.

This invention relates to a process for preparing nutritious cooked rice in aseptic package by mixing ginseng, jujube, chestnut and black rice, which has excellent taste and smell and capability of long-term preservation at room temperature.

The invention relates to a process for preparing cooked rice in aseptic package having capability of long-term preservation at room temperature, which comprises the steps of:

pretreating ginseng, jujube and chestnut by blenching and soaking in mixed solution of calcium solution and organic acid or phosphoric acid solution; mixing pretreated ginseng; jujube and chestnut with raw material rice at a fixed rate and filling the mixture automatically in a heat-resisting plastic container; sterilizing the mixture at high temperature and high pressure; cooking with steam after adding a measured amount of liquid for cooking; and packaging the resultant in a clean room.

Preferably, the organic acid according to the invention is at least one selected from the group consisting of citric acid, and gluconic acid. Preferably, calcium according to the invention is at least one selected from the group consisting of calcium chloride and whey calcium, however the sort of calcium is not restricted if it can be used in food. Preferably, the concentration of the solution of organic acid or phosphoric acid and the solution of calcium according to the invention is 0.1~0.3% respectively. Preferably, according to the invention, the pretreatment step includes the steps of blenching ginseng in a 0.1~0.3% organic acid or phosphoric acid solution at 60° C. for 20 minutes after cutting ginseng into fixed size pieces, and soaking jujube and chestnut in mixed solution of 0.1~0.3% calcium solution and 0.1~0.3% organic acid or phosphoric acid solution at 25° C. for 1 hour after cutting into fixed size pieces, to reduce microorganism level and improve texture.

The invention includes the steps of mixing ginseng, jujube and chestnut with raw material rice, filling a fixed amount of the mixture automatically in a heat-resisting plastic container, sterilizing the mixture 4~10 times repeatedly for 4~8 seconds at high temperature of 130~150° C. and high pressure hermetically, cooking the sterilized mixture with steam at 100° C. for 30 minutes in a fixed amount of liquid for cooking, sealing and packaging the resultant in aseptic. Preferably, liquid for cooking is mixed with a fixed amount of glucono delta lactone(GDL), to adjust pH of liquid and to adjust final pH of the product to 4.0~5.0.

According to the invention, a step of blenching ginseng in 0.1~0.3% organic acid or phosphoric acid solution at 50~70°

C. for 20~30 minutes is carried out to maintain the texture and reduce microorganism level. And a step of soaking jujube and chestnut in mixed solution of 0.1~0.3% calcium solution and 0.1~0.3% organic acid or phosphoric acid solution at 25° C. for 1~1.5 hour is carried out to maintain the texture and reduce microorganism levels. The raw material rice can include nonglutinous rice, glutinous rice and black rice, that is mixed at a fixed rate, washed with purified water to remove impurities, and soaked in purified water 1~1.5 hours.

The pretreated raw material rice is mixed with the pretreated ginseng, jujube and chestnut at a fixed rate after removing water and a fixed amount of the mixture is filled automatically in a heat-resisting plastic container. The container filled with raw material is sterilized 4~10 times repeatedly for 4~8 seconds at high temperature of 130~150° C. and high pressure hermetically and then cooked with steam at 100° C. in a fixed amount of liquid for cooking mixed with glucono delta lactone(GDL).

After cooking, the resultant is hermetically sealed with lid film in clean room (at least class 100 or better clean room), aged, cooled and dried so as to obtain resultant product. Through the process, cooked rice in aseptic package having capability of long-term preservation at room temperature is produced. The process of the invention is described on FIG. 1.

EXAMPLE 1

Steps of blenching ginseng in 0.1~0.3% organic acid or phosphoric acid solution at 60° C. for 20 minutes and treating it with steam at 100° C. were carried out and microorganism level at each step was measured.

Likewise, steps of soaking processed chestnut product, raw chestnut and jujube in mixed solution of 0.1~0.3% calcium solution and 0.1~0.3% organic acid or phosphoric acid solution for 1 hour and treating it with steam at 100° C. were carried out and the microorganism level at each step was measured. The concentration of the organic acid or phosphoric acid solution was regulated according to microorganism level which needs control.

EXAMPLE 2

Raw material rice was mixed with ginseng, jujube, processed chestnut product and raw chestnut treated according to the example 1, after removing water from the materials. The mixture was filled in a heat-resisting container and put into high temperature high pressure steam sterilizer (manufactured by Shinwa co.) hermetically and sterilized with high pressure steam at 140~143° C. for 6 seconds. The high temperature high-pressure steam sterilization step was repeated 7 times more.

After the sterilization, GDL solution as liquid for cooking rice was added to each container which have been sterilized and the mixture in the container was cooked for 30 minutes keeping steam temperature of 100° C. After finishing cooking, the resultant was hermetically sealed with lid film under aseptic conditions and left alone for 12 minutes to be well aged and then cooled in 10° C. water for 15 minutes to finish manufacturing process. The microorganism level of the resultant product was measured. The pH of the resultant product was about 5.0. The concentration of GDL needs control according to microorganism level of goal.

EXAMPLE 3

To improve the texture of raw material, raw material was treated with 0%, 0.05%, 0.1% and 0.2% calcium solution according to the condition of the example 1, and the texture of the raw material, at pretreatment step, was analyzed using Texture Analyzer (SMS, TA-XT2). The concentration of calcium needs control according to texture level of the raw material.

EXPERIMENTAL EXAMPLE 1

Microorganism level of the raw material, treated according to the example 1 and that of the product produced according to the example 2 is described in table 1 below.

TABLE 1

| Classification | Initial stage | Treated with 0.2% phosphoric acid solution | Treated with steam for 10 minutes | Final stage |
|---|---|---|---|---|
| Ginseng | | | | |
| General bacteria | 2.7 × 10⁵ | 6.8 × 10² | — | — |
| Heat-resistant bacteria | 35 | — | — | — |
| Jujube | | | | |
| General bacteria | 2.0 × 10³ | 25 | — | — |
| Heat-resistant bacteria | — | — | — | — |
| Processed chestnut product | | | | |
| General bacteria | — | — | — | — |
| Heat-resistant bacteria | — | — | — | — |
| Raw chestnut | | | | |
| General bacteria | 4.4 × 10⁴ | 75 | — | — |
| Heat-resistant bacteria | — | — | — | — |
| Final Product | | | | |
| General bacteria | | | | — |
| Heat-resistant bacteria | | | | — |

(unit: cfu/g)

EXPERIMENTAL EXAMPLE 2

The analysis of texture according to the example 3 is described in table 2 below.

TABLE 2

| Classification | Ginseng | Chestnut | Jujube | Remark |
|---|---|---|---|---|
| Not treated (0%) | 48.4 | 4.7 | 0.1 | The hardness of raw material increased in proportion to increase of calcium concentration |
| 0.05% | 53.9 | 12.4 | 60.4 | |
| 0.1% | 46.9 | 14.7 | 70.0 | |
| 0.2% | 62.0 | 16.1 | 91.5 | |

(unit: kg m/S²)

EXPERIMENTAL EXAMPLE 3

Sensory test for the nutritious cooked rice in aseptic package produced by the process of the invention, was carried out by two hundreds forty consuming publics. The sensory test was conducted at four items such as flavor, mouthfeel, completeness and synthetic taste. According to the result of sensory test, the product of the invention showed good result. The result is shown in table 3.

TABLE 3

| Classification | Flavor | Mouthfeel | Completeness | Synthetic taste |
|---|---|---|---|---|
| | 3.7 | 3.9 | 3.8 | 3.9 |

* In the sensory test, the quality of the product was evaluated in 5 grades in accordance with the following criteria and expressed in the average.
5: Very good, 4: Good, 3: Moderate, 2: Bad, 1: Very bad.

The invention relates to a process for preparing nutritious cooked rice in aseptic package by mixing ginseng, jujube and chestnut, which has excellent taste and flavor by improving the texture and controlling microorganism level of raw material, which satisfies the safety from microorganism by using liquid for cooking whose pH is adjusted, and which is capable of long-term preservation (more than 6 months) at room temperature. Moreover, the invention produces a process for preparing cooked rice in aseptic package having texture, taste and flavor equal to that of cooked rice prepared by general method at home.

What is claimed is:

1. A process for preparing aseptically packaged cooked rice, comprising:
    blanching ginseng in a phosphoric acid solution to produce pretreated ginseng;
    soaking jujube and chestnut in a mixed solution comprising a calcium solution and a phosphoric acid solution to produce a pretreated mixture;
    mixing raw material rice with the pretreated ginseng and the pretreated mixture to produce a rice mixture;
    hermetically sterilizing the rice mixture, after filling the rice mixture in a heat-resisting plastic container, at a temperature from 130° C. to 150° C. for 4 to 8 seconds, wherein the hermetically sterilizing is carried out from 4 to 10 times, to produce a sterilized rice mixture;
    cooking the sterilized rice mixture for 30 minutes with steam at a temperature of 100° C. after adding a fixed amount of liquid for cooking, the liquid comprising a fixed amount of glucono delta lactone (GDL) sufficient to adjust the pH of the liquid and to adjust the final pH of the cooked rice to a pH of 4.0 to 5.0, to produce cooked rice; and
    sealing and packaging the cooked rice in a clean room, whereby aseptically packaged cooked rice is produced.

2. The process of claim 1, wherein blanching comprises:
    blanching ginseng in a 0.2% phosphoric acid solution at 60° C. for 20 minutes after cutting ginseng into fixed sized pieces to produce pretreated ginseng.

3. The process of claim 1, wherein soaking comprises:
    soaking jujube and chestnut in a mixed solution comprising a 0.1% to 0.3% calcium solution and a 0.2% phosphoric acid solution at 25° C. for 1 hour after cutting the jujube and the chestnut into fixed sized pieces, to reduce microorganism levels and to improve texture to produce a pretreated mixture.

* * * * *

UNITED STATES PATENT AND TRADEMARK OFFICE
CERTIFICATE OF CORRECTION

| | | |
|---|---|---|
| PATENT NO. | : 7,314,645 B2 | Page 1 of 1 |
| APPLICATION NO. | : 10/691604 | |
| DATED | : January 1, 2008 | |
| INVENTOR(S) | : Lee et al. | |

It is certified that error appears in the above-identified patent and that said Letters Patent is hereby corrected as shown below:

Claim 2, Column 6, Line 21,
Please delete "cuffing"
and
replace with
-- cutting --

Signed and Sealed this

Twenty-ninth Day of April, 2008

JON W. DUDAS
*Director of the United States Patent and Trademark Office*